Figure 1:
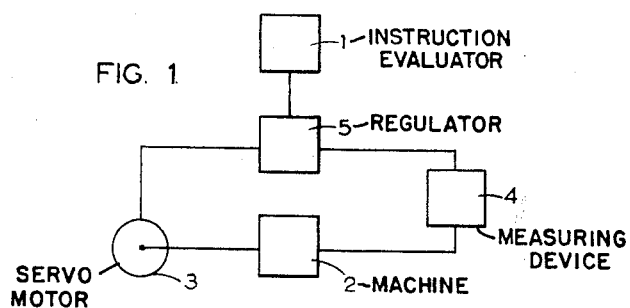

Nov. 10, 1959    F. C. WOLFENDALE    2,912,630
SERVOSYSTEM WITH PROPORTIONALITY FACTOR CHANGE PROVISION
Filed Oct. 5, 1955

Inventor
F. C. Wolfendale

United States Patent Office 2,912,630
Patented Nov. 10, 1959

2,912,630

SERVOSYSTEM WITH PROPORTIONALITY FACTOR CHANGE PROVISION

Frederick Caleb Wolfendale, Ealing, London, England, assignor to Electric & Musical Industries Limited, Hayes, Middlesex, England, a company of Great Britain Application October 5, 1955, Serial No. 538,598

Claims priority, application Great Britain October 13, 1954

2 Claims. (Cl. 318—19)

This invention relates to apparatus for effecting automatic process control.

It has previously been proposed to provide apparatus for automatically controlling machine tools, such for example as milling machines, so that processes can be carried out automatically under the control of information stored, for example, on punched tapes. Such apparatus is diagrammatically represented in Figure 1 of the drawing in which the reference 1 represents the instruction evaluator for deriving information from the punched tape or other record and setting up corresponding instruction signals. The machine which is controlled is represented by reference 2 and the operations of the machine are controlled by servo means 3 while a measuring device 4 is arranged to measure in some way the end product of the process and set up a suitable voltage analogous to the position of the tool or other condition of the machine. This analogue is applied to an automatic regulator 5 which receives the instructions from the instruction evaluator 1. In the regulator 5 the two input signals are compared and differences between the compared signals form the input signal to the servo means 3 in known manner. One form of apparatus for effecting automatic process control is described in United States patent application Serial No. 518,912.

One object of the present invention is to provide improved automatic control apparatus whereby the scale of the controlled process can be readily varied.

Another object of the present invention is to provide improved automatic control apparatus which facilitates the preliminary test production of a desired product.

According to the present invention there is provided automatic process control apparatus comprising means for deriving an instruction signal related to a desired process by a first factor of proportionality, servo means for performing the desired process, means for deriving a signal related to the process performed by said servo means by a second factor of proportionality, means for comparing said signals to derive an error signal, said servo means being responsive to said error signal to perform said process, and means for varying one of said factors relative to the other, whereby the process performed by the servo-means can be related to the instruction signal by a plurality of scale factors.

Figure 2:
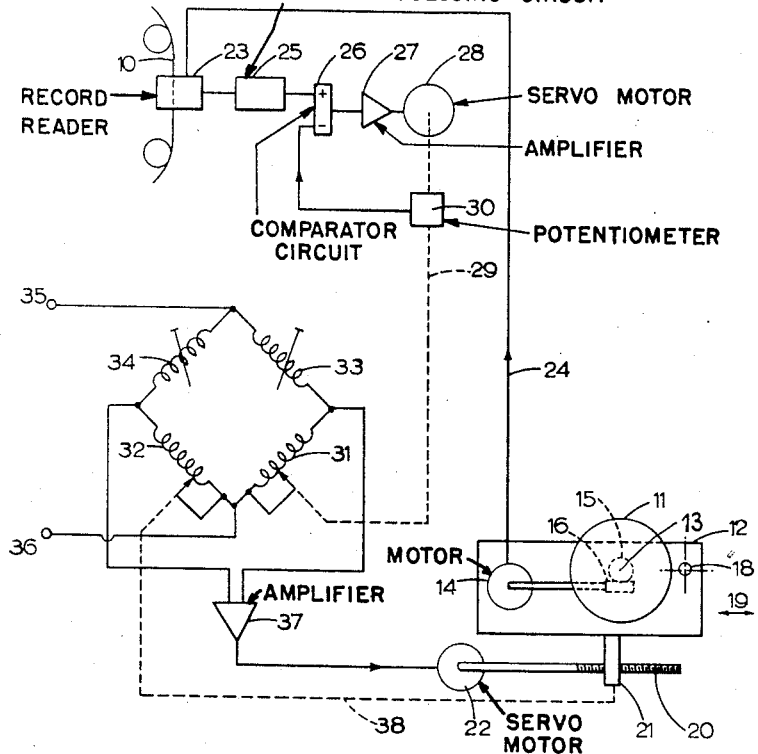

In order that the invention may be clearly understood and readily carried into effect, the invention will be described with reference to the accompanying drawings, Figure 1 of which has already been referred to and, in which Figure 2 illustrates diagrammatically and partly in block form one example of apparatus for effecting automatic process control in accordance with the present invention.

In Figure 2, reference 10 denotes a punched tape or other suitable record on which are recorded discrete instructions for the control of an automatic machine. The machine is an automatic milling machine and comprises a worktable 11 which is mounted on a slide 12 so that it can be rotated about a vertical axis denoted by the reference 13 by an electric motor 14 which drives the worktable 11 through gears such as indicated by the dotted lines 15 and 16. Reference 18 represents the shaft of a milling cutter which is rotatably mounted in the head of the machine in any suitable manner so that the axis of the shaft is vertical and is fixed with reference to the bed of the machine. The slide 12 of the machine is on the other hand displaceable in a horizontal plane in either direction of the arrow 19 by the action of a lead screw 20 which engages a nut 21 secured to the slide. The lead screw 20 is driven by a servo-motor 22 and it will be appreciated that by moving the slide to and fro by the action of the lead screw 20 and simultaneously rotating the worktable 11 by the action of the motor 14 the milling cutter can be caused to describe a predetermined locus on a workpiece secured to the worktable. The servo-motor is moreover responsive to instructions derived from the record 10, so that the aforesaid locus is automatically determined by this instruction.

For achieving the control of the servo-motor 22 in response to the recorded instructions the apparatus comprises a tape reader 23 which is arranged to derive instructions from the record at a rate related to the rate of rotation of the table 11, the tape reader being for example synchronised by the motor 14 in any suitable manner and as represented by the connection 24. Instructions derived from the tape by the reader 23 are applied to a processing circuit 25 which converts the instructions into electrical signals of an amplitude related to a desired displacement of the slide 12 by a predetermined factor of proportionality. The instruction reader 23 and the processing circuit 25 have been shown merely in block form since their construction forms no part in the present invention and since they may be of any suitable construction. One form of apparatus for deriving an electrical analogue signal from a record is described, for example, in U.S. patent specification No. 2,690,532 in the name of C. Johnson. It is preferred, however to use apparatus of the construction described in the specification of U.S. patent application Serial No. 518,912. If the apparatus is of the construction described in this co-pending application, the instructions may consist of binary code signals representing radii of the locus at successive angular displacements, and in this case the processing circuit 25 is arranged to derive a continuous voltage analogue signal by first converting derived signals into discrete voltage analogue signals, storing these signals cyclically in groups, and then deriving the continuous signal from the stored signals by a process of interpolation. The components 10, 23 and 26 of Figure 2 therefore correspond to the parts denoted by the block 1 in Figure 1. The continuous voltage analogue signal derived from the processing circuit 25 forms one input to a comparator circuit 26 whose output is applied via amplifier 27 to a servo-motor 28. The shaft of the servo-motor 28 is represented diagrammatically by the dotted line 29 and the reference 30 represents a potentiometer device for setting up an electrical voltage signal related to the angular displacement of the shaft 29 by a predetermined factor of proportionality. This voltage signal forms the second input to the comparator circuit 26 and the input signal to the amplifier 27 is therefore the difference between the compared signals so that the servo-motor 28 tends to displace the shaft 29 to a position related to the signal derived from the processing circuit 25 by a fixed factor of proportionality. The shaft 29 controls a variable inductor 31 included in one arm of a bridge circuit which has further inductors 32, 33 and 34 included in its other arm as shown. An alternating voltage of fixed amplitude, having a frequency of say 1000 cycles per second is applied between terminals 35 and 36 connected respectively to one pair of conjugate points of the bridge and any voltage appearing between the other pair of conjugate points forms the input signal to an amplifier 37, whose output in turn forms the input signal for the servo-motor 22. There is moreover a mechanical connection represented by the dotted line 38 between the nut 21 and the inductor 32 in such a way that the value of the inductor 32 is varied so as to represent the displacement of the nut 21 and therefore of the slide 12 from a predetermined datum. The servo-motor 22 therefore tends to maintain the bridge circuit balanced and balance is achieved when a predetermined ratio exists between the inductors 31 and 32, this ratio depending on the values of the inductors 33 and 34. Therefore the servo-motor 22 tends to displace the slide 12 by amounts which are related to the corresponding signals derived from the processing circuit 25 by a scale factor which is determined by the ratio of the inductors 33 and 34.

The condition for balance of the bridge is that $$\frac{Z1}{Z2} = \frac{Z3}{Z4}$$

where $Z1$, $Z2$, $Z3$ and $Z4$ are respectively the impedances of the inductors 31, 32, 33 and 34. Moreover, the bridge circuit and the motor 22 constitute means for varying the factor of proportionality between the displacement ultimately produced by the servo motor 28, namely the displacement of the slide 12, and the signal derived from the potentiometer 30 and representing this latter displacement. Obviously therefore by manually adjusting the inductors 33 and 34 the scale factor between the recorded instructions and the radii of the corresponding points on the locus described on a work piece can be varied, and to this end the inductors 33 and 34 are manually variable as indicated. It will also be appreciated that scale factors which are greater than one can be achieved as well as scale factors which are less than one.

Although the invention has been described as applied to an automatic milling machine it is applicable generally to apparatus for effecting automatic process control. In its application to automatic machines it may be applied to the manufacture of precisely scaled models, for example of aeroplane wings, from full scale instructions recorded on the record. The model can then be tested and if found satisfactory the same record can be used to make the full scale part.

Other forms of bridge circuit than that illustrated can be used, although the use of variable inductors is preferred since by using inductors wound on toroidal cores a high degree of accuracy can be obtained. Other expedients may also be adopted for varying the scale factor. For example the servo-motor 28 may be arranged to drive the lead screw 20 directly and a variable ratio gear may be introduced between the servo-motor and the potential device 30 for setting up the analogue of the displacement produced by the servo-motor. In this form of the invention the bridge circuit, the servo-motor 22 and the control circuits therefor are unnecessary.

What I claim is:

1. Automatic control apparatus comprising means for deriving from a record a signal representing a desired displacement, servo means for producing a displacement, an electrical bridge circuit, means for varying the impedance in one arm of said bridge circuit to a value related to said derived signal by a first factor of proportionality, means for varying the impedance of another arm of said bridge circuit to a value related to displacement produced by said servo means by a second factor of proportionality, said servo means being responsive to the output between conjugate points of said bridge circuit to produce said displacement, thereby to tend to maintain said bridge circuit in a balanced condition, and means for varying the impedance of at least one other arm of said bridge circuit to vary one of said factors of proportionality relative to said other, whereby the displacement produced by said servo means can be selectively related to the signal derived from the record by a plurality of scale factors.

2. Automatic control apparatus comprising means for deriving from a record a signal representing a desired displacement, first servo means for producing displacement, a feedback signal generator responsive to displacement produced by said first servo means for deriving a signal proportional to said displacement, a comparator for comparing said signals to derive an error signal, said servo means being responsive to said error signal to produce said displacement, an electrical bridge circuit having four arms joined each to each and each including an impedance, input terminals for applying electrical energy to the bridge circuit connected to one pair of conjugate points of said bridge circuit, means responsive to displacement produced by said first servo means for varying the impedance of one arm of said bridge circuit, second servo means responsive to the output between the other pair of conjugate points of said bridge circuit to produce displacement, means responsive to displacement produced by said second servo means for varying the impedance of another arm of said bridge circuit, thereby to tend to maintain said bridge circuit in a balanced condition and means for varying the impedance of at least one other arm of said bridge circuit independently of either of said servo means to vary the ratio of the displacement produced by said first servo means to the displacement produced by said second servo means.

References Cited in the file of this patent

UNITED STATES PATENTS

| 2,116,593 | Bouvier et al. | May 10, 1938 |
| 2,628,539 | Neergaard | Feb. 17, 1953 |
| 2,710,934 | Senn | June 14, 1955 |
| 2,724,082 | Hornfeck | Nov. 15, 1955 |
| 2,741,732 | Cunningham | Apr. 10, 1956 |
| 2,812,481 | Roosdorp | Nov. 5, 1957 |

FOREIGN PATENTS

| 904,481 | France | Mar. 5, 1945 |

OTHER REFERENCES

"A Numerically Controlled Milling Machine," Servomechanism Laboratory, M.I.T., 1951.